United States Patent Office 3,101,374
Patented Aug. 20, 1963

3,101,374
POLYOXYALKYLENE SURFACE ACTIVE AGENTS HAVING HETERIC POLYOXYETHYLENE SOLUBILIZING CHAINS
John T. Patton, Jr., Wyandotte, Mich., assignor to Wyandotte Chemicals Corporation, Wyandotte, Mich., a corporation of Michigan
No Drawing. Filed Aug. 19, 1958, Ser. No. 755,852
11 Claims. (Cl. 260—584)

This invention relates to a new class of surface active agents prepared from alkylene oxides. In a more specific aspect, this invention relates to a new approach for making surface active agents which have a "conjugated" or block polymer structure employing a hydrophobic oxyalkylene, usually oxypropylene, chain or chains as the nucleus and being characterized by having a heteric oxyethylene chain or chains attached to the hydrophobic oxyalkylene chain. The distinguishing feature of the new class of surface active agents is the heteric hydrophilic oxyethylene chain or chains which are composed of oxyethylene groups having defined proportions of different and higher molecular weight oxyalkylene groups, such as oxypropylene or oxybutylene groups, randomly distributed throughout the hydrophilic oxyethylene chain.

U.S. Patents 2,674,619 and 2,677,700 describe novel groups of conjugated polyoxypropylene-polyoxyethylene compounds which have outstanding detergent and surface active properties. These compounds represent a fundamental departure from conventional nonionic surface active agents in that the hydrophobic element of the compounds is a polymeric chain of oxypropylene groups. These conjugated polyoxypropylene-polyoxyethylene compounds are prepared by condensing propylene oxide with a relatively low molecular weight organic compound containing one or more reactive hydrogen atoms to prepare a hydrophobic polyoxypropylene polymer having a molecular weight of at least about 400–900. The hydrophobic polyoxypropylene polymer is then converted into a surface active agent by condensing ethylene oxide therewith in an amount such that the oxyethylene groups constitute 20–90%, by weight, of the final product.

For reasons which are not fully understood, the above described products are somewhat heterogeneous in their composition and individual molecules within the product may differ considerably from one another both in molecular weight and oxyethylene content. Such heterogeneity has no substantial effect upon the surface active properties of the compounds, but frequently has an undesirable effect upon the physical properties of the compositions. For example, it is frequently observed that a liquid product will contain a small percentage of an insoluble material which imparts a distinct haze to the product and deposits on the interior surfaces of pipes, lines, valves, etc. through which the liquid product is distributed. It has also been observed that the presence of such insoluble material in predominantly liquid products leads to cloudy products of unduly high viscosity. Such solid materials have been analyzed and are predominantly polymers of higher oxyethylene contents than the average composition of the mixture. Since such insoluble materials are themselves good surface active agents, they do not adversely affect the surface active properties of the compositions, but their presence in predominantly liquid products causes serious handling difficulties.

In studying this problem and the difficulties associated therewith, I have discovered that the shortcomings of the previously described compositions can be overcome by adding a percentage of propylene oxide or other higher molecular weight alkylene oxide to the ethylene oxide that is condensed with the hydrophobic polyoxyalkylene polymer to prepare the compounds of interest. It has been discovered that the liquid products which are obtained by this modification are sparkling clear mobile liquids which are more fluid and have appreciably lower viscosities than do the compositions prepared by the addition of 100% ethylene oxide to the same hydrophobic polyoxyalkylene polymer. It also has been observed, most surprisingly, that the physical state of the resulting compounds is remarkably changed, solids becoming pastes, pastes becoming liquids and the viscosity of liquids reduced, which is highly desirable in many uses of nonionic surface active agents.

The term "alkylene oxide" is used throughout the specification and claims to mean $\alpha, \beta$ alkylene oxide in which the ring oxygen atom is attached to two unsatisfied valence bonds of adjacent carbon atoms.

The hydrophobic element of these new compounds is a polyoxyalkylene polymer in which at least most of the individual oxyalkylene groups contained therein have at least 3 carbon atoms in their structure. An essential characteristic of the hydrophobic element of the new compounds is that the total hydrophobic alkylene oxide ingredient therein has an average oxygen/carbon atom ratio of not greater than 0.40. Since oxypropylene groups have an oxygen/carbon atom ratio of 0.33, the oxyalkylene ingredient used in making the hydrophobic portion of the compositions can be propylene oxide or mixtures thereof with ethylene oxide or butylene oxide or other higher molecular weight alkylene oxides with the proportions used being such that the oxygen/carbon atom ratio does not exceed 0.40.

The hydrophilic elements of these compounds are polymeric chains of oxyethylene groups having higher molecular weight oxyalkylene groups which contain at least 3 carbon atoms in their structure randomly and intermittently distributed therein. Since the oxypropylene group is the group most frequently incorporated in the hydrophilic chain with the oxyethylene groups, henceforth, for the sake of convenience in description, such hydrophilic chains are referred to, at times, simply as heteric polyoxyethylene-polyoxypropylene chains. It will be recognized, however, that wherever this term is used other higher oxyalkylene groups such as the oxybutylene group, the oxyamylene and the oxystyrene group, may be used in lieu of the oxypropylene group.

These conjugated polyoxyalkylene compounds are prepared by first condensing the hydrophobic alkylene oxide ingredient, described above, having an average oxygen/carbon atom ratio of not greater than 0.40 with an organic reactive hydrogen compound containing one or a plurality of reactive hydrogen atoms and having up to about 6 carbon atoms to prepare a hydrophobic polyoxyalkylene intermediate having a molecular weight of at least about 400–900, and subsequently condensing therewith a mixture of ethylene oxide and a higher molecular weight alkylene oxide. The mixture of ethylene oxide and higher molecular weight alkylene oxide employed should contain at least about 5 weight percent of the higher molecular weight alkylene oxide but must have an average oxygen/ carbon atom ratio of greater than 0.40. The conjugated polyoxyalkylene compounds of this invention conform to the following generic formula:

(A)   $Y(-P-E-H)_x$ wherein Y is the nucleus of an organic reactive hydrogen compound containing $x$ reactive hydrogen atoms and having up to 6, inclusive, carbon atoms, $x$ is an integer, P is a hydrophobic polyoxyalkylene chain having an oxygen/carbon atom ratio of not more than 0.40, the molecular weight of P and the value of $x$ being such that the molecule, excluding E, has a molecular weight of at least about 400–900 and up to about 25,000, and E is a hydrophilic heteric polyoxyalkylene chain which (1) contains oxyethylene groups and at least 5%, by weight, of higher molecular weight oxyalkylene groups having at least 3 carbon atoms in their structure and (2) has an average oxygen/carbon atom ratio of greater than 0.40, E being present in the composition to the extent that it constitutes from 5–90 weight percent of the total composition.

The hydrophobic polyoxyalkylene polymer, which is an intermediate in the preparation in the compounds of this invention, has the following structure:

(B)   $Y(-P-H)_x$ wherein Y, P and $x$ are defined as in Formula A above and the molecular weight of the hydrophobic polyoxalkylene polymer is at least about 400–900 and may range up to 25,000 or higher.

When P in Formula B above is a polymeric chain of oxypropylene groups, the hydrophobic polyoxyalkylene polymer is a polyoxypropylene polymer having the formula:

(C)   $Y[(C_3H_6O)_n-H]_x$ wherein Y and $x$ are defined as in Formula A above and $n$ is an integer. In an illustrative example, when Y is the nucleus of propylene glycol and P is a polymeric chain of oxypropylene groups, the hydrophobic polyoxypropylene polymer is simply a polyoxypropylene glycol. When Y is the residue of n-propanol, the polyoxypropylene polymer is simply the n-propyl ether of a polyoxypropylene glycol. When Y is the residue of a dibasic organic acid, such as adipic acid, the polyoxypropylene polymer has the following structure:

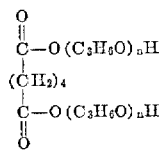

When P of Formula B is a polymeric chain of oxybutylene groups, the hydrophobic polyoxyalkylene polymer has the following structure:

(D)   $Y[C_4H_8O)_n-H]_x$ wherein Y, $n$ and $x$ are defined as previously set forth.

The molecular weight required in the hydrophobic polyoxyalkylene polymer to obtain surface active properties depends upon both the number of carbon atoms in the alkylene oxide or oxides used in making the hydrophobic polyoxyalkylene intermediate and the reactive hydrogen compound used in initiating the polymerization of the hydrophobic alkylene oxide ingredient. When the hydrophobic polyoxyalkylene intermediate is prepared by condensing propylene oxide with a reactive hydrogen compound containing only one reactive hydrogen atom, a minimum molecular weight of about 400 is required. Where, however, the reactive hydrogen compound contains a plurality of reactive hydrogen atoms, the hydrophobic polyoxypropylene intermediate must have a molecular weight of at least about 900. When the hydrophobic polyoxyalkylene intermediate is prepared by condensing butylene oxide with a reactive hydrogen compound containing a plurality of reactive hydrogen atoms, a molecular weight of about 500 is required.

The compounds of this invention are prepared by condensing a mixture of ethylene oxide and a higher molecular weight alkylene oxide having at least 3 carbon atoms in its structure with the hydrophobic polyoxyalkylene intermediate in an amount sufficient to constitute 5–90%, by weight, of the resultant product. The mixture of ethylene oxide and higher molecular weight alkylene oxide employed in the hydrophilic portion of the compounds of this invention must contain at least 5%, by weight, of the higher molecular weight alkylene oxide and have an average oxygen/carbon atom ratio of greater than 0.40.

In preparing the hydrophobic polyoxyalkylene intermediate, the condensation of propylene oxide, for example, with the reactive hydrogen compound is normally carried out at elevated temperatures and pressures in the presence of an alkaline catalyst such as a sodium alkoxide, a quaternary ammonium base, or preferably sodium hydroxide. Similarly, the condensation reaction may be carried out in the presence of acid catalysts as set forth in U.S. Patent No. 2,510,540.

Although the reaction may be carried out by simply heating a mixture of the reactants under pressure at a sufficiently high temperature, this procedure is not ordinarily used as the temperatures and pressures required are excessive and control of the reaction is difficult. For each mol of propylene oxide reacting, an estimated 25 kilogram-calories of heat is liberated which, in the presence of a large quantity of propylene oxide, may increase the temperature and reaction rate to such an extent that the reaction assumes and explosive nature.

The preferred method of carrying out the preparation of the hydrophobic intermediate is to add the propylene oxide to a stirred, heated mixture of the desired reactive hydrogen compound and alkaline catalyst in a sealed reaction vessel. By adding the propylene oxide to the reaction vessel at such a rate that it reacts as rapidly as added, an excess of propylene oxide is avoided and control of the reaction is simplified.

The temperature at which the hydrophobic intermediate is prepared depends upon the particular system in question and especially upon the catalyst concentration used. Generally, at higher catalyst concentrations the reaction can be run at lower temperatures and correspondingly lower pressures. The temperatures and pressures required for any given reaction will vary with the reactive hydrogen compound and the type and concentration of catalyst used.

The condensation of the mixtur eof ethylene oxide and propylene oxide or other higher molecular weight alkylene oxide is carried out in an analogous manner.

As noted heretofore, the hydrophobic polyoxyalkylene intermediate is prepared by condensing an alkylene oxide ingredient having an oxygen/carbon atom ratio of less than 0.40, such as propylene oxide, with a reactive hydrogen compound containing at least one, and preferably not more than about 6, reactive hydrogen atoms and having up to 6 carbon atoms. Since the reactive hydrogen compound constitutes only a small proportion of the total composition, it ordinarily does not have a significant influence on the properties thereof. In other words, the particular reactive hydrogen compound employed in preparing the conjugated polyoxyalkylene compounds is not critical so long as it furnishes at least one reactive hydrogen atom, and useful surface active compositions are obtained regardless of the particular reactive hydrogen compound employed in the preparation of the hydrophobic polyoxyalkylene polymer.

The term reactive hydrogen atom is well known and clearly understood by those skilled in the art. However, to remove any possible ambiguity in this regard, the term reactive hydrogen atom, as used herein and in the appended claims, includes any hydrogen atom fulfilling the following two conditions:

(1) It is sufficiently labile to open the epoxide ring of 1,2-propylene oxide or ethylene oxide, and
(2) It reacts with methyl magnesium iodide to liberate methane in the classical Zerewitinoff reaction (see Niederl and Niederl, Micromethods of Quantitative Organic Analysis, p. 263, John Wiley and Sons, New York City, 1946).

The reactive hydrogen atoms which will fulfill the above two conditions are normally activated by being a member of a functional group containing an oxygen atom, e.g. a hydroxyl group, a phenol group, a carboxylic acid group; a basic nitrogen atom (e.g. an amine group, a hydrazine group, an imine group, an amide group, a guanidine group, a sulfonamide group, a urea group, a thiourea group; or a sulfur atom, e.g. a mercaptan, a thiophenol, a thiocarboxylic acid, hydrogen sulfide. Alternatively, certain hydrogen atoms may be activated by proximity to carbonyl groups such as those found in cyanoacetic esters, acetoacetic esters, malonic esters, as is well known in the art.

Thus, the lower molecular weight, monohydroxy alcohols constitute one class of reactive hydrogen compounds that is especially useful in preparing the compositions of this invention. Such alcohols can have up to about 6, inclusive, carbon atoms per molecule and examples of these materials are methanol, n-propanol, n-butanol, n-hexanol, methyl ether of ethylene glycol and phenol.

In this connection, it probably would be well to point out that the hydrogen atom in the hydroxyl radical attached to a teriary carbon atom has been recognized as being unreactive with alkylene oxides, such as ethylene oxide and propylene oxide, under conventional base-catalyzed reaction conditions, so such compounds as tertiary butanol, alpha- or beta-terpineol are not reactive hydrogen compounds adaptable for use in preparing the compositions of the invention. Actually, tertiary butanol has been recommended in the prior art as a solvent for base-catalyzed alkylene oxide reactions because of its unreactivity therewith and we have found that alpha- and beta-terpineol do not react with ethylene oxide, or propylene oxide for that matter, under conventional base-catalysis conditions.

The lower molecular weight aliphatic polyhydric alcohols constitute another class of reactive hydrogen compounds that is especially useful in preparing the compositions of this invention. Such alcohols can have from about 2 to 6, inclusive, carbon atoms per molecule, and examples of these materials are ethylene glycol, propylene glycol, 2,3-butylene glycol, 1,3-butylene glycol, 1,5-pentanediol, 1,6-hexanediol, glycerol, trimethylolpropane, sorbitol, sucrose and the like. Another class of reactive hydrogen compounds that can be used is the alkylamines and alkylene polyamines having at least 2 reactive hydrogen atoms, such as methylamine, ethylamine, propylamine, butylamine, hexylamine, ethylenediamine, 1,6-hexanediamine, diethylenetriamine, and the like. Also, such cyclic amines as piperazine, 2-methylpiperazine and 2,5-dimethylpiperazine can also be used. Amides constitute a further class of such reactive hydrogen compounds, such as acetamide, succinamide and benzenesulfonamide. A still further class of such reactive hydrogen compounds is the di- and polycarboxylic acids, such as adipic acid, succinic acid, glutaric acid, aconitic acid, diglycollic acid, and the like.

Another class of reactive hydrogen compounds that can be used is secondary amines, such as dimethylamine, diethylamine, morpholine, N-ethylbutylamine, dipropylamine, N-methylethylamine, N-ethylpropylamine, and the like. A further class of reactive hydrogen compounds is N-monosubstituted amides, such as methyl acetamide, N-ethylbenzenesulfonamide, N-propylethanesulfonamide, and the like. A still further class is monocarboxylic acids, such as acetic acid, benzoic acid, butanoic acid, and the like. Still other such reactive hydrogen compounds can also be used so long as the particular compound meets the requirements set forth, i.e., relatively low molecular weight, reactivity with ethylene oxide and only a single reactive hydrogen atom.

The amount of the hydrophobic alkylene oxide ingredient used has been expressed in terms of the molecular weight of the resulting reactive hydrogen compound-alkylene oxide condensate. It is to be understood that the term "molecular weight" means theoretical molecular weight throughout this specification and the claims. In expressing the molecular weight for the hydrophobic polyoxyalkylene intermediate, the molecular weight of the reactive hydrogen compound is included. This molecular weight should be, as stated earlier, at least about 400–900 and can range up to about 25,000 or higher. Compositions having the most desirable properties as detergents usually are based on a hydrophobic polyoxyalkylene intermediate having a molecular weight in the range of about 1500–10,000.

The heteric polyoxyethylene chains constitute the hydrophilic element of the conjugated polyoxyalkylene compounds and must constitute a prescribed, although broad, proportion of the molecule. The hydrophilic polyoxyethylene content must be controlled to obtain a proper hydrophobic-hydrophilic balance, which is essential to obtain good surface active properties.

The compounds herein described which contain 20–90%, by weight, of such heteric polyoxyethylene chains are in nearly all cases miscible with water in all proportions at room temperature and are highly efficient general purpose detergents. Optimum detergent properties are usually obtained when the compounds contain 30–70% of heteric polyoxyethylene chains.

On the other hand, the compounds of this application which contain 5–20% of heteric polyoxyethylene chains are only sparingly soluble in water at room temperature, but have a relatively high solubility in many nonpolar solvents. The principal applications of these compounds lie outside the field of laundry detergents. For example, because of their relatively high solubility in nonpolar solvents they may be employed as surface active agents in formulated dry cleaning solvents. Another outstanding characteristic of these compounds is their extraordinary ability to remove grease from raw wool, as measured by the method of Barnett and Powers (The Journal of the Society of Cosmetic Chemists, vol. II, page 219, 1951).

The heteric polyoxyethylene chains employed in the compositions of this invention contain 40–95% oxyethylene groups and 5–60% oxypropylene groups or other higher molecular weight oxyalkylene groups, such as oxybutylene, oxystyrene or mixtures of such oxyalkylene groups. Where the heteric polyoxyethylene chains contain substantially less than about 5% of higher molecular weight oxyalkylene groups, the compositions do not differ materially from compositions in which the hydrophilic chains are straight polyoxyethylene chains. When 5–10% of oxypropylene groups, for example, are included in the heteric polyoxyethylene chains, the physical properties of the compositions are materially improved (as compared with compositions containing straight polyoxyethylene chains) in that they have lower viscosity and greater clarity than the compounds containing straight polyoxyethylene chains as the hydrophilic element. As the percent oxypropylene groups in the heteric polyoxyethylene chains is increased, the physical properties of the compositions such as viscosity, clarity and change in physical state from solid to paste to liquid show still further improvement, but the surface active properties are also noticeably modified. A practical upper limit on the amount of higher molecular weight alkylene oxide in the mixture with ethylene oxide used to produce the heteric polyoxyethylene chains is approximately 60%, for when this value is exceeded by any substantial amount the surface active properties of the compositions fall off rapidly.

It will be apparent from the foregoing discussion that the compositions of this invention can be prepared using, specifically, a mixture of propylene oxide and ethylene oxide for condensation with an active hydrogen compound to form the hydrophobic polymer base and using a mixture of ethylene oxide and propylene oxide for condensation with the hydrophobic polymer base to form the hydrophilic chains, and thereby, a novel surface active compound. Furthermore, it has been disclosed that the relative percentages of propylene oxide and ethylene oxide employed in the first step to form the hydrophobic base can fall in the range of 60 to 95 weight percent propylene oxide and 40 to 5 weight percent ethylene oxide, while the relative percentages of propylene oxide and ethylene oxide employed in the mixture to form the hydrophilic chains can fall in the range of 95 to 40 weight percent ethylene oxide and 5 to 60 weight percent propylene oxide. It is thus apparent that, by choosing the extremes of these ranges, a product can be obtained which contains 60 weight percent propylene oxide and 40 weight percent ethylene oxide in both the hydrophobic base and the hydrophilic chains. Such a composition would not have surface activity and is not contemplated by the present invention. It will be noted that each of the appended claims defines the compound of the invention as one having "surface active properties" and therefore the nonsurface active compound described above is not claimed herein. Furthermore, each of the claims specifies in terms or equivalent language that the average oxygen to carbon atom ratio for the hydrophobic polymer base is not more than 0.40 and is greater than 0.40 for the hydrophilic chains condensed therewith. Thus, the eventuality discussed is literally avoided.

Fully equivalent products are obtained when a higher molecular weight alkylene oxide other than propylene oxide is employed in the preparation of the heteric hydrophilic chains of the compounds of this invention. Examples of higher molecular weight alkylene oxides that may be employed include butylene oxide, amylene oxide, cyclohexene oxide, styrene oxide, etc. As in the case of propylene oxide, it is necessary to have at least 5%, by weight, of the higher molecular weight oxyalkylene units in the chain to obtain significant improvements in the properties of the compounds. Unlike propylene oxide, however, it is not feasible to incorporate 60% of the higher molecular weight oxyalkylene groups in the hydrophilic chains where the higher molecular weight oxyalkylene group contains 4 or more carbon atoms in its structure. Instead, the upper limit on the higher molecular weight oxyalkylene content must be reduced so that the hydrophilic chains have an average oxygen/carbon atom ratio of greater than 0.40.

The compositions of this invention are excellent general purpose detergents. The detergency of these compositions was determined by the carbon soil removal test procedure set forth in U.S. 2,677,700, column 14, lines 50–75, column 15, lines 1–75 and column 16, lines 1–6.

The compositions of this invention, in addition to the above described outstanding ability to remove soil from the textile fabric (i.e. detergency as measured by carbon soil removal value), also possess remarkable ability to retain the soil suspended in the suspension once it is removed. This latter ability is measured by the "whiteness retention" test, set forth in U.S. 2,677,700, column 16, lines 7–75.

Numerical values obtained with the compounds of this invention nearly always exceed 200% of standard and may reach values as high as 300% of standard.

A particularly attractive feature of the compositions of the present invention is that they combine good detergency with low foaming properties. The foaming properties of the compositions of this invention were determined by the following described test procedure:

FOAM HEIGHT TEST PROCEDURE

To evaluate the foam characteristics of the compositions of this invention, a 0.10% by weight solution of the composition to be tested was prepared in tap water and 10 liters of this solution was placed in a Pyrex jar measuring 10" in diameter and 10" in height. This Pyrex jar was equipped with a propeller-type stirrer, knife blade heaters, a thermoregulator and a thermometer. A small centrifugal pump was arranged to circulate the solution contained in this jar through a calibrated glass flow meter to a jet orifice prepared from the base of a No. 20 Becton, Dickinson and Company hypodermic needle by enlarging the hole in the base with a No. 56 twist drill. The jet orifice was mounted coaxially inside a Pyrex glass tube (51 mm. by 910 mm.) which was placed vertically in the solution. The jet was positioned so that is was 600 mm. above the surface of the solution in the jar, and the Pyrex tube was arranged to project 210 mm. below the surface of the solution.

The solution was brought to temperature by means of the knife blade heater and maintained at 120° F. by means of a thermoregulator. The centrifugal pump was started and a flow of 350 ml. of solution per minute was metered through the jet. The flow was adjusted by bypassing part of the stream back into the Pyrex jar before passing through the flow meter. The solution passing through the jet was directed against the wall of the vertical tube while the flow was adjusted and the temperature equilibrated to prevent foaming prior to the actual determination. The jet was then arranged to pass the solution coaxially downward through the tube without touching the tube walls to impinge upon the surface of the solution located in the Pyrex tube. Timing was initiated from the instant the solution impinged on the liquid surface and the foam height was read at the end of 10 minutes. The foam height readings were obtained from a calibration on the outside of the Pyrex tube with the zero mark being at the surface of the solution.

The preparation of the conjugated polyoxyalkylene compounds of this invention and their improved properties are illustrated by the following examples.

Examples

A series of surfactant compositions having heteric polyoxyethylene chains according to this invention was prepared and evaluated and a summary of these compositions and their properties is presented in Table I. Also, a series of compositions according to U.S. 2,674,619 and U.S. 2,677,700 employing straight polyoxyethylene hydrophilic chains and having the same molecular weight in the hydrophobic polyoxyalkylene intermediate and the same weight percent of hydrophilic chains as in the compositions of the invention was prepared and evaluated for comparison purposes. A summary of the comparison compositions and their properties is presented in Table II.

All of the compositions were prepared in a one gallon, stainless steel autoclave equipped with a stirrer, thermocouple, pressure gauge and reactant inlet tube whose outlet was directly under the stirrer. The reactive hydrogen compound and catalyst were initially charged into the reactor. Due to volume limitations the compositions were prepared by adding the alkylene oxide ingredients in two or three stages.

Sodium hydroxide was the catalyst used in all stages when propylene glycol and n-propanol were the reactive hydrogen compounds used. When ethylenediamine was the reactive hydrogen compound used, water was used as the catalyst in the first stage and sodium hydroxide was the catalyst used in subsequent stages. Water was also used as the catalyst in the first stage of the reaction when 1,6-hexanediamine, ethylamine, diethylenetriamine, n-butylamine and 2-methylpiperazine were the reactive hydrogen compounds used and in these examples potassium hydroxide was used as the catalyst in subsequent stages. Potassium hydroxide was used sa the catalyst in all stages when glycerol, trimethylolpropane, 1,5-pentanediol, n-hexanol, methanol and acetic acid were the reactive hydrogen compounds used. When pentaerythritol was used as the reactive hydrogen compound, N-methylmorpholine was the catalyst in the first stage and potassium hydroxide was the catalyst in subsequent stages.

In the runs using N-methylmorpholine or water as the catalyst, the reactor was washed and dried following removal of the first stage product before charging KOH catalyst for the second and subsequent stages. Also, in the runs where N-methylmorpholine or water was used as catalyst in the first stage, the product of the first stage was stripped at 100° C. and about 4 mm. Hg pressure for one hour before charging a portion of this product to the second stage.

After charging the reactive hydrogen compound and catalyst, the hydrophobic alkylene oxide ingredient, usually propylene oxide or propylene oxide mixed with a small proportion of ethylene oxide, was admitted to the reactor while maintaining a reaction temperature in the range of 50–135° C. and an average pressure of 1–90 p.s.i.g. The total reaction time was usually between 3–30 hours.

When the hydrophobic polyoxyalkylene intermediate was obtained having the molecular weight indicated in the tables, the intermediate was then reacted with a mixture of ethylene oxide and propylene oxide or a mixture of ethylene oxide, propylene oxide and butylene oxide in the proportions indicated in Table I, the amount of the ethylene oxide mixture used being sufficient so that the heteric polyoxyethylene chains thus formed constituted the weight percent of the total composition indicated in Table I.

The compositions of the invention prepared and the evaluation of their properties are presented below in Table I. The sign "_____" under certain headings, such as Carbon Soil Removal Value at 90° F., means that this test was not carried out and the particular composition has been destroyed.

| Ex. No. | Reactive Hydrogen Compound | Oxypropylene Chain(s) | | Oxyethylene Chain(s) | | Carbon Soil Removal Value | | Foam Height at 120° F. | Cloud Point, °C. | Physical State | Viscosity cps. |
|---|---|---|---|---|---|---|---|---|---|---|---|
| | | mol. wt.[1] | PO/EO wt. ratio | EO/PO wt. ratio | wt. percent of total comp. | at 90° F. | at 140° F. | | | | |
| 1 | Propylene Glycol | 1,017 | all PO | 75/25 | 33 | | 105 | 17 | 33 | Liquid | |
| 2 | do | 2,300 | all PO | 90/10 | 29 | | 146 | 10 | 19 | do | |
| 3 | do | 2,300 | all PO | 75/25 | 29 | | 138 | 0 | 19 | do | |
| 4 | do | 2,300 | all PO | 90/10 | 40 | | 264 | 70 | 51 | do | |
| 5 | do | 2,300 | all PO | 85/15 | 40 | | 200 | 20 | 24 | do | |
| 6 | do | 2,300 | all PO | 77/23 | 40 | | 203 | | 41 | do | |
| 7 | do | 2,300 | all PO | 75/25 | 40 | | 198 | 15 | 24 | do | |
| 8 | do | 2,300 | all PO | 70/30 | 40 | | 173 | 10 | 23 | do | |
| 9 | do | 2,300 | all PO | 60/40 | 40 | | 160 | 5 | 20 | do | |
| 10 | do | 2,300 | all PO | 50/50 | 40 | | 121 | 4 | 21 | do | |
| 11 | do | 2,300 | all PO | 40/60 | 40 | | 115 | 0 | 19 | do | |
| 12 | do | 2,300 | all PO | 90/10 | 80 | | 138 | 590 | [8] none | Solid | |
| 13 | do | 2,300 | all PO | 50/50 | 80 | | 239 | 260 | 53 | Liquid | |
| 14 | do | 3,720 | all PO | 90/10 | 15 | | 114 | 0 | 14 | do | |
| 15 | do | 1,500 | 90/10 | 90/10 | 25 | | 123 | 75 | 62 | do | |
| 16 | do | 2,300 | 90/10 | 90/10 | 29 | | 163 | 0 | 30 | do | |
| 17 | do | 3,720 | 90/10 | 70/30 | 45 | | 212 | 75 | 50 | do | |
| 18 | do | 3,720 | 70/30 | 90/10 | 45 | | 121 | 120 | 75 | do | |
| 19 | n-Propanol | 1,000 | all PO | 90/10 | 50 | | 283 | 155 | 60 | do | |
| 20 | do | 1,000 | all PO | 80/20 | 50 | | 278 | 65 | 57 | do | |
| 21 | do | 1,000 | all PO | 70/30 | 50 | | 160 | 35 | 47 | do | |
| 22 | do | 1,000 | all PO | 60/40 | 50 | | 154 | 15 | 40 | do | |
| 23 | do | 1,000 | 90/10 | 90/10 | 50 | | 249 | 115 | 70 | do | |
| 24 | do | 1,000 | 90/10 | 70/30 | 50 | | 174 | 15 | 51 | do | |
| 25 | do | 1,000 | 90/10 | 60/40 | 50 | | 124 | 10 | 30 | do | |
| 26 | Ethylenediamine | 3,600 | all PO | [2] 85/15 | 75 | 135 | 212 | 130 | 81 | Paste | |
| 27 | do | 3,600 | all PO | 75/25 | 75 | 124 | 203 | >600 | 45 | Liquid | |
| 28 | 1,6-Hexanediamine | 8,000 | all PO | [3] 90/5/5 | 45 | 206 | 187 | >600 | 58 | do | 7,900 |
| 29 | do | 8,000 | all PO | 85/15 | 45 | 260 | 147 | 90 | 49 | do | 1,125 |
| 30 | Ethylamine | 2,000 | all PO | [4] 95/5 | 71 | 143 | 363 | >600 | [8] none | Paste | |
| 31 | do | 2,000 | all PO | 80/20 | 71 | 156 | 299 | >600 | 46 | Liquid | |
| 32 | Diethylene Triamine | 6,000 | all PO | 80/20 | 60 | 183 | 241 | 170 | 73 | do | 1,810 |
| 33 | do | 6,000 | all PO | 75/25 | 60 | 199 | 237 | 175 | 66 | do | 1,600 |
| 34 | n-Butylamine | 2,500 | all PO | [5] 92/5/3 | 50 | 131 | 259 | 18 | 54 | do | 337 |
| 35 | do | 2,500 | all PO | 60/40 | 50 | 112 | 163 | 119 | 45 | do | 410 |
| 36 | 2-Methylpiperazine | 2,500 | all PO | [6] 85/10/5 | 33 | 105 | 175 | 8 | 26 | do | 310 |
| 37 | do | 2,500 | all PO | 80/20 | 33 | 103 | 165 | 8 | 25 | do | 370 |
| 38 | Glycerol | 4,000 | all PO | 90/10 | 60 | 194 | 157 | >600 | 87 | do | |
| 39 | do | 4,000 | all PO | 75/25 | 80 | 112 | 132 | >600 | 75 | do | |
| 40 | Trimethylolpropane | 2,500 | all PO | [7] 90/10 | 80 | 95 | 155 | >600 | 86 | Paste | |
| 41 | do | 2,500 | all PO | 85/15 | 80 | 97 | 143 | >600 | 87 | Liquid | |
| 42 | do | 3,200 | 90/10 | 90/10 | 40 | 95 | 235 | 585 | 59 | do | |
| 43 | Pentaerythritol | 8,000 | all PO | 95/5 | 65 | 120 | 226 | >600 | 58 | do | 690 |
| 44 | do | 8,000 | all PO | 70/30 | 80 | 85 | 137 | 290 | 69 | do | 1,200 |
| 45 | Methanol | 1,500 | all PO | 90/10 | 80 | 63 | 109 | >600 | 95 | Paste | 2,210 |
| 46 | do | 1,500 | all PO | 75/25 | 80 | 66 | 118 | >600 | 73 | Liquid | |
| 47 | do | 3,000 | all PO | [3] 90/5/5 | 50 | 126 | 174 | >600 | 71 | do | |
| 48 | do | 3,000 | all PO | 80/20 | 50 | 120 | 154 | 350 | 60 | do | 880 |
| 49 | n-Hexanol | 1,800 | all PO | 85/15 | 40 | 170 | 195 | 80 | 45 | do | 340 |
| 50 | 1,5-Pentanediol | 6,000 | all PO | 90/10 | 33 | 173 | 90 | 20 | 34 | do | 895 |
| 51 | do | 6,000 | all PO | [3] 90/5/5 | 33 | 162 | 93 | 21 | 34 | do | 1,195 |
| 52 | do | 6,000 | all PO | [3] 90/5/5 | 33 | 165 | 84 | 20 | 28 | do | 940 |
| 53 | do | 6,000 | all PO | 70/30 | 33 | 145 | 88 | 12 | 26 | do | 825 |
| 54 | Acetic Acid | 2,600 | all PO | 85/15 | 50 | 106 | 252 | 365 | 62 | do | 745 |
| 55 | do | 2,600 | all PO | [6] 85/10/5 | 50 | 107 | 241 | 110 | 56 | do | 735 |
| 56 | do | 2,600 | all PO | 67/33 | 50 | 115 | 213 | 32 | 46 | do | 590 |
| 57 | Benzenesulfonamide | 6,000 | all PO | 90/10 | 50 | 162 | 121 | 85 | 65 | do | |
| 58 | do | 6,000 | all PO | [3] 90/5/5 | 50 | 165 | 141 | 75 | 64 | Paste | |
| 59 | do | 6,000 | all PO | 70/30 | 50 | 164 | 131 | 42 | 49 | Liquid | |
| 59a | Butylene Glycol | 2,050 | [9] all BO | 80/20 | 60 | 251 | 270 | 500 | 53 | do | |
| 59b | do | 2,050 | [9] all BO | 80/20 | 80 | 146 | 183 | 630 | 82 | do | |

[1] Theoretical molecular weight based on weight of reactants used and including molecular weight of reactive hydrogen compound.
[2] 85 wt. percent EO—15 wt. percent butylene oxide.
[3] 90 wt. percent EO—5 wt. percent PO—5 wt. percent butylene oxide.
[4] 95 wt. percent EO—5 wt. percent butylene oxide
[5] 92 wt. percent EO—5 wt. percent PO—3 wt. percent butylene oxide.
[6] 85 wt. percent EO—10 wt. percent PO—5 wt. percent butylene oxide.
[7] 90 wt. percent EO—10 wt. percent butylene oxide.
[8] "None" under cloud point means no cloud point was detected up to the boiling point of water at atmospheric pressure.
[9] Hydrophobe formed of oxybutylene chains. No oxypropylene groups present in hydrophobe.

The liquid compositions of the invention are characterized by sparkling clarity and mobility. Evaluation of the compositions of the invention is best accomplished by comparing compositions according to U.S. 2,674,619 and U.S. 2,677,700 which are in all respects the same except that the latter have hydrophilic chains of straight polyoxyethylene groups rather than mixtures of oxyethylene groups and higher molecular weight oxyalkylene groups. These compositions were prepared by the same procedure as set forth for the compositions of the invention and a summary of the comparable compositions of U.S. 2,674,-619 and U.S. 2,677,700 and their properties is set forth below in Table II.

TABLE II.—COMPARISON EXAMPLES—COMPOSITIONS OF U.S. 2,674,619 AND U.S. 2,677,700

| Ex. No. | Reactive Hydrogen Compound | Oxypropylene Chain(s), mol wt.[1] | Oxyethylene Chain(s), wt. percent of total composition | Carbon Soil Removal Value at 90° F. | at 140° F. | Foam Height at 120° F. | Cloud Point, °C. | Physical State | Viscosity, cps. |
|---|---|---|---|---|---|---|---|---|---|
| 60 | Propylene Glycol | 1,017 | 33 | | 92 | 28 | 36 | Liquid | |
| 61 | do | 2,300 | 29 | | 150 | 35 | 23 | do | |
| 62 | do | 2,300 | 40 | | 275 | >600 | 60 | do | |
| 63 | do | 2,300 | 80 | | 125 | >600 | 115 | Solid | |
| 64 | do | 3,720 | 15 | | 104 | 10 | 18 | Liquid | |
| 65 | do | 3,720 | 45 | | 225 | >600 | 70 | Paste | |
| 66 | do | 1,500 | 25 | | 265 | 360 | 70 | Liquid | |
| 67 | n-Propanol | 1,000 | 50 | | 227 | >600 | 79 | Paste | |
| 68 | Ethylenediamine | 3,600 | 75 | 133 | 166 | >600 | [2] none | Solid | |
| 69 | 1,6-Hexanediamine | 8,900 | 45 | | 245 | >600 | 71 | Paste | |
| 70 | Ethylamine | 2,000 | 71 | | 126 | 302 | >600 | [2] none | do | |
| 71 | Diethylene Triamine | 6,000 | 60 | | 144 | 204 | >600 | [2] none | do | |
| 72 | n-Butylamine | 2,500 | 50 | | 115 | 231 | >600 | 80 | Liquid | 1560 |
| 73 | 2-Methylpiperazine | 2,500 | 33 | | 200 | 285 | 235 | 23 | do | |
| 74 | Glycerol | 4,000 | 60 | | 206 | 154 | >600 | [2] none | Solid | |
| 75 | do | 4,000 | 80 | | 97 | 111 | 220 | [2] none | do | |
| 76 | Trimethylolpropane | 2,500 | 80 | | 92 | 125 | 495 | [2] none | do | |
| 77 | do | 3,200 | 40 | | 136 | 214 | >600 | 59 | Liquid | 3700 |
| 78 | Pentaerythritol | 8,000 | 65 | | 114 | 197 | >600 | 71 | do | 2210 |
| 79 | do | 8,000 | 80 | | 83 | 132 | 560 | [2] none | Solid | |
| 80 | Methanol | 1,500 | 80 | | 69 | 93 | 530 | [2] none | do | |
| 81 | do | 3,000 | 50 | | 126 | 176 | >600 | 83 | do | |
| 82 | n-Hexanol | 1,800 | 40 | | 216 | 270 | 340 | 56 | Liquid | 5000 |
| 83 | 1,5-Pentanediol | 6,000 | 33 | | 205 | 174 | 43 | 38 | do | |
| 84 | Acetic Acid | 2,600 | 50 | | 93 | 227 | >600 | 72 | Paste | |
| 85 | Benzenesulfonamide | 6,000 | 50 | | 161 | 139 | 180 | 85 | Solid | |
| 86 | Butylene Glycol | [3] 2,050 | 60 | | 195 | 274 | >600 | 78 | Paste | |
| 87 | do | [3] 2,050 | 80 | | 138 | 162 | >600 | [2] none | Solid | |

[1] See footnote (1), Table I.
[2] "None" under cloud point means no cloud point was detected up to the boiling point of water at atmospheric pressure.
[3] Hydrophobe formed of oxybutylene chains. No oxypropylene groups present in hydrophobe.

A review of the data in Tables I and II will show the remarkable changes and improvements that are obtained in the compositions of the invention having heteric polyoxyethylene chains. Example 26 based on ethylenediamine is a paste having excellent detergency effectiveness at 90° F. while the comparable compound (Example 68) according to U.S. 2,674,619 is a solid composition. Example 17 based on propylene glycol is a liquid also showing excellent detergency at 90° F. while the comparable compond (Example 65) according to U.S. 2,674,619 is a paste. The foam height of Example 65 was >600 mm. while the foam height of Example 17 was 75 mm.

It will be observed that the compositions of the invention are consistently more mobile than the compounds of the prior art. Where both compositions are liquids, the compositions of the invention have lower viscosities. In many cases where the compounds of the prior art are solids or pastes, the compositions of the invention are pastes or liquids. Most importantly, the haziness of the liquid compounds of the prior art is remarkably improved in the compositions of the invention. Overcoming the haziness and tendency to be cloudy which has been a problem with the compositions of the prior art is probably the most important advantage for the compositions of the invention.

This application is a continuation-in-part of my pending application Serial No. 550,562, filed December 2, 1955.

I claim:

1. A surface active mixture of conjugated polyoxyalkylene compounds, said compounds consisting of the nucleus of an organic reactive hydrogen compound having from 1 to 6 reactive hydrogen atoms and being selected from the group consisting of mono- and polyhydric alkanols having up to 6 carbon atoms per molecule, alkyl ethers of alkanols having up to 6 carbon atoms per molecule, primary alkylamines having up to 6 carbon atoms per molecule, secondary dialkylamines having up to 6 carbon atoms per molecule, alkylene polyamines having up to 6 carbon atoms per molecule, piperazine, carbon-substituted methylpiperazines, alkane amides having up to 6 carbon atoms per molecule, N-alkyl alkane amides having up to 6 carbon atoms per molecule, benzenesulfonamide, N-ethylbenzenesulfonamide, N-propylethanesulfonamide, and mono- and polycarboxylic alkanoic acids having up to 6 carbon atoms per molecule, a hydrophobic polyoxyalkylene chain having an average oxygen/carbon atom ratio of not more than 0.40 attached at one end thereof to the nucleus of said organic reactive hydrogen compound at the site of each of its reactive hydrogen atoms, said hydrophobic polyoxyalkylene chain consisting of polymers of oxalkylene groups selected from the group consisting of oxypropylene, oxybutylene, oxyamylene, oxystyrene, mixtures of said oxyalkylene groups with each other and mixtures of said oxyalkylene groups with oxyethylene groups, the molecular weight of said organic reactive hydrogen compound and attached hydrophobic polyoxyalkylene chains being in the range of at least about 400–900 and up to about 25,000, and a heteric hydrophilic polyoxyethylene chain attached to the other end of each of said hydrophibic polyoxyalkylene chains, said heteric hydrophilic polyoxyethylene chain consisting essentially of 95–40 weight percent of oxyethylene groups and 5–60 weight percent of higher molecular weight oxyalkylene groups selected from the group consisting of oxypropylene, oxybutylene, oxystyrene and mixtures thereof, said heteric hydrophilic polyoxyethylene chain having an average oxygen/carbon atom ratio of greater than 0.40 and the weight of said heteric hydrophilic polyoxyethylene chain being such as to constitute from 5–90 weight percent of the mixture of compounds.

2. A surface active mixture of conjugated polyoxyalkylene compounds according to claim 1 wherein said organic reactive hydrogen compound has a single reactive hydrogen atom.

3. A surface eactive mixture of conjugated polyoxyalkylene compounds according to claim 1 wherein said organic reactive hydrogen compound has from 2 to 6 reactive hydrogen atoms.

4. A surface active mixture of conjugated polyoxyalkylene compounds according to claim 1 wherein said hydrophobic polyoxyalkylene chain consists essentially of oxypropylene groups and wherein the higher molecular weight oxyalkylene groups in said heteric hydropholic polyoxyethylene chain are oxypropylene groups.

5. A surface active mixture of conjugated polyoxyalkylene compounds according to claim 4 wherein said hydrophobic polyoxyalkylene chain consists essentially of 95–60 weight percent of oxypropylene groups and 5–40 weight percent of oxyethylene groups.

6. A surface active mixture of conjugated polyoxyalkylene compounds, said compounds consisting of the nucleus of propylene glycol as a reactive hydrogen compound, hydrophobic polyoxypropylene chains attached at one end thereof to said propylene glycol nucleus at the sites of its reactive hydrogen atoms, the molecular weight of said propylene glycol nucleus and attached polyoxypropylene chains being about 900–25,000, and heteric hydrophilic polyoxyethylene chains attached to the other ends of said hydrophobic polyoxypropylene chains, said heteric polyoxyethylene chains having an oxygen/carbon atom ratio of greater than 0.40 and consisting essentially of 95–40 weight percent oxyethylene groups and 5–60 weight percent oxypropylene groups, and said heteric polyoxyethylene chains constituting 5–90 weight percent of the surface eactive mixture of conjugated polyoxyalkylene compounds.

7. A surface active mixture of conjugated polyoxyalkylene compounds, said compounds consisting of the nucleus of glycerol as a reactive hydrogen compound, hydrophobic polyoxypropylene chains attached at one end thereof to said glycerol nucleus at the sites of its reactive hydrogen atoms, the molecular weight of said glycerol nucleus and attached polyoxypropylene chains being about 900–25,000, and heteric hydrophilic polyoxyethylene chains attached to the other ends of said hydrophibic polyoxypropylene chains, said heteric polyoxyethylene chains having an oxygen/carbon atom ratio of greater than 0.40 and consisting essentially of 95–40 weight percent oxyethylene groups and 5–60 weight percent oxypropylene groups, and said heteric polyoxyethylene chains constituting 5–90 weight percent of the surface active mixture of conjugated polyoxyalkylene compounds.

8. A surface active mixture of conjugated polyoxyalkylene compounds, said compounds consisting of the nucleus of ethylenediamine as a reactive hydrogen compound, hydrophobic polyoxypropylene chains attached at one end thereof to said ethylenediamine nucleus at the sites of its reactive hydrogen atoms, the molecular weight of said ethylenediamine nucleus and attached polyoxypropylene chains being about 900–25,000, and heteric hydrophilic polyoxyethylene chains attached to the other ends of said hydrophobic polyoxypropylene chains, said heteric polyoxyethylene chains having an oxygen/carbon atom ratio of greater than 0.40 and consisting essentially of 95–40 weight percent oxyethylene groups and 5–60 weight percent oxypropylene groups, and said heteric polyoxyethylene chains constituting 5–90 weight percent of the surface active mixture of conjugated polyoxyalkylene compounds.

9. A surface active mixture of conjugated polyoxyalkylene compounds, said compounds consisting of the nucleus of trimethylolpropane as a reactive hydrogen compound, hydrophobic polyoxypropylene chains attached at one end thereof to said trimethylolpropane nucleus at the sites of its reactive hydrogen atoms, the molecular weight of said trimethylolpropane nucleus and attached polyoxypropylene chains being about 900–25,000, and heteric hydrophilic polyoxyethylene chains attached to the other ends of said hydrophobic polyoxypropylene chains, said heteric polyoxyethylene chains having an oxygen/carbon atom ratio of greater than 0.40 and consisting essentially of 95–40 weight percent oxyethylene groups and 5–60 weight percent oxypropylene groups, and said heteric polyoxyethylene chains constituting 5–90 weight percent of the surface active mixture of conjugated polyoxyalkylene compounds.

10. A surface active mixture of conjugated polyoxyalkylene compounds, said compounds consisting of the nucleus of methanol as a reactive hydrogen compound, a hydrophobic polyoxypropylene chain attached at one end thereof to said methanol nucleus at the site of its reactive hydrogen atom, the molecular weight of said methanol nucleus and attached polyoxypropylene chain being about 400–25,000, and a heteric hydrophilic polyoxyethylene chain attached to the other end of said hydrophobic polyoxypropylene chain, said heteric polyoxyethylene chain having an oxygen/carbon atom ratio of greater than 0.40 and consisting essentially of 95–40 weight percent oxyethylene groups and 5–60 weight percent oxypropylene groups, and said heteric polyoxyethylene chain constituting 5–90 weight percent of the surface active mixture of conjugated polyoxyalkylene compounds.

11. A method of preparing a surface active mixture of conjugated polyoxyalkylene compounds, which comprises, heating in the presence of an alkaline catalyst an organic reactive hydrogen compound having from 1 to 6 reactive hydrogen atoms and being selected from the group consisting of mono- and polyhydric alkanols having up to 6 carbon atoms per molecule, alkyl ethers of alkanols having up to 6 carbon atoms per molecule, primary alkylamines having up to 6 carbon atoms per molecule, secondary dialkylamines having up to 6 carbon atoms per molecule, alkylene polyamines having up to 6 carbon atoms per molecule, piperazine, carbon-substituted methylpiperazines, alkane amides having up to 6 carbon atoms per molecule, N-alkyl alkane amides having up to 6 carbon atoms per molecule, benzenesulfonamide, N-ethylenesulfonamide, N-propylethanesulfonamide, and mono- and polycarboxylic alkanoic acids having up to 6 carbon atoms per molecule, and a hydrophobic alkylene oxide reactant having an oxygen/carbon atom ratio of not more than 0.40 and being selected from the group consisting of propylene oxide, butylene oxide, amylene oxide, styrene oxide, mixtures of said alkylene oxides with each other, mixtures of said alkylene oxides and ethylene oxide, the amount of said hydrophobic alkylene oxide reactant employed being sufficient so that the combined molecular weight of the reactive hydrogen compound and hydrophobic alkylene oxide reactant is at least about 400–900 and up to about 25,000, and subsequently heating said hydrophobic polyoxyalkylene intermediate in the presence of an alkaline catalyst with a mixture of ethylene oxide and a higher molecular weight alkylene oxide selected from the group consisting of oxypropylene, oxybutylene, oxystyrene and mixtures thereof, said mixture of ethylene oxide and higher molecular weight alkylene oxide consisting essentially of 95–40 weight percent oxyethylene groups, 5–60 weight percent higher molecular weight oxyalkylene groups and having an oxygen/carbon atom ratio of greater than 0.40, the amount of said mixture of ethylene oxide and higher molecular weight alkylene oxide employed being such as to constitute 5–90 weight percent of the surface active mixture of conjugated polyoxyalkylene compounds.

References Cited in the file of this patent

UNITED STATES PATENTS

| | | |
|---|---|---|
| 2,174,761 | Schuette et al. | Oct. 3, 1939 |
| 2,425,755 | Roberts | Aug. 19, 1947 |
| 2,674,619 | Lundsted | Apr. 6, 1954 |
| 2,677,700 | Jackson et al. | May 4, 1954 |

UNITED STATES PATENT OFFICE
CERTIFICATE OF CORRECTION

Patent No. 3,101,374                                            August 20, 1963

John T. Patton, Jr.

It is hereby certified that error appears in the above numbered patent requiring correction and that the said Letters Patent should read as corrected below.

Column 4, line 19, for "temepratures" read -- temperatures --; line 34, for "and" read -- an --; line 52, for "mixtur" read -- mixture --; column 5, line 33, for "teriary" read -- tertiary --; column 9, line 2, for "sa" read -- as --; columns 9 and 10, insert the following as a heading to the table

TABLE I

COMPOSITIONS OF INVENTION column 12, line 57, for "hydrophibic" read -- hydrophobic --; column 12, line 68, for "conjungated" read -- conjugated --; line 72, for "eactive" read -- active --; column 13, line 5, for "hydropholic" read -- hydrophilic --; line 27, for "eactive" read -- active --; line 37, for "hydrophibic" read -- hydrophobic --; column 14, lines 37 and 38, for "N-ethylenesulfonamide" read -- N-ethylbenzenesulfonamide --.

Signed and sealed this 26th day of May 1964.

(SEAL)
Attest:

ERNEST W. SWIDER                                            EDWARD J. BRENNER

Attesting Officer                                          Commissioner of Patents